April 13, 1943. L. A. WEINSTEIN 2,316,732
JOINT FOR DOLL BODIES
Filed June 7, 1941
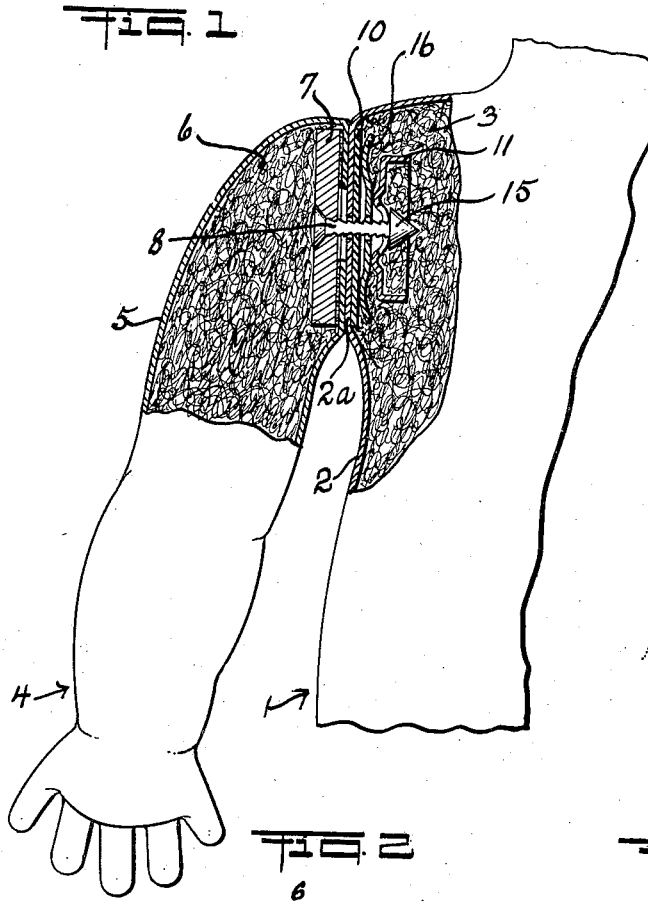
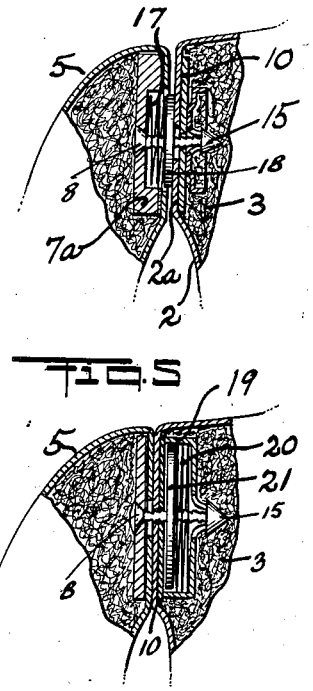
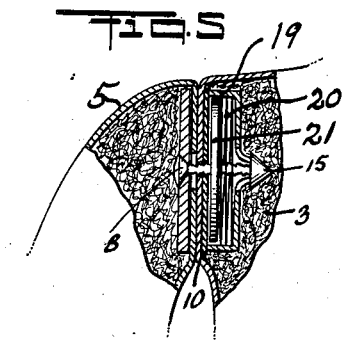
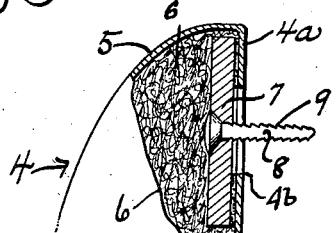
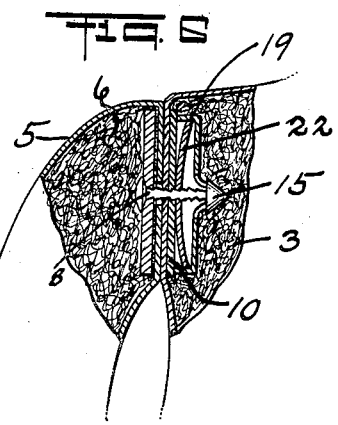
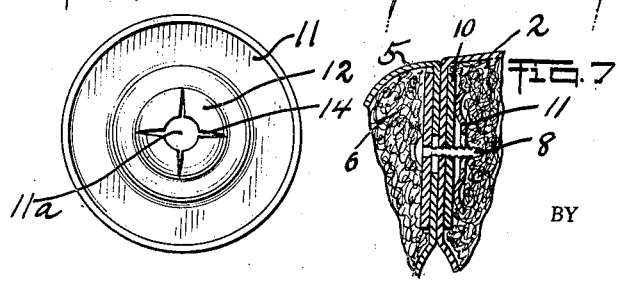
INVENTOR.
Louis A. Weinstein
BY Mock & Blum
ATTORNEYS Patented Apr. 13, 1943

2,316,732

UNITED STATES PATENT OFFICE 2,316,732

JOINT FOR DOLL BODIES

Louis A. Weinstein, Brooklyn, N. Y., assignor to Ideal Novelty & Toy Co., Long Island City, N. Y., a corporation of New York Application June 7, 1941, Serial No. 397,044

2 Claims. (Cl. 46—173)

My invention relates to a new and improved joint for a doll body.

One of the objects of my invention is to provide simple and efficient means for movably assembling the torso of a doll body with a limb thereof.

Another object of the invention is to provide a joint construction which can be easily and cheaply assembled, which will permit the limb to turn relative to the torso and which will hold the limb relative to the torso in adjusted position.

Other objects of my invention will be set forth in the following description and drawing which illustrates certain preferred embodiments, it being understood that the above statement of the objects of my invention is intended generally to explain the same without limiting it in any manner.

Fig. 1 is a partial elevation, partly in section, illustrating one embodiment of the invention.

Fig. 2 is a partial elevation, partly in section, of an arm member. This illustrates a different embodiment of the coupling member.

Fig. 3 is a top plan view of the resilient holding washer which is an element of the combination which is shown in Fig. 1.

Figs. 4-6 inclusive are generally similar to Fig. 1 and they illustrate different embodiments of the invention.

Fig. 7 illustrates the assembly of the parts shown in Fig. 2, with the body member of the doll.

The torso or body 1 of the doll has a skin 2 which is made of flexible and elastic rubber. Said torso also has a resilient stuffing 3. The invention is illustrated in connection with an arm member 4. This arm member 4 has a skin 5 which is also made of flexible and elastic rubber, and said arm member 4 has a resilient stuffing 6.

A rigid disc 7, which is made of any suitable material, is cemented or otherwise connected to the inner end of the arm member 4. For this purpose the skin 5 is provided with an annular flange 4a, whose inner face is cemented to the adjacent face of the disc 7. The diameter of the disc 7 is substantially equal to the outer diameter of the flange 4a. The nail 8 is rigidly secured to the disc 7. This nail 8 has ratchet serrations 9, which are inclined towards the head of the nail 8. The disc 7 and the nail 8 may be assembled by driving the shank of the nail 8 through the disc 7.

In the embodiment illustrated herein, the inner edge 4b of the flange 4a is spaced substantially from the shank of the nail 8. The invention is not limited to this, because the flange 4a may be made of any width so that this inner edge 4b abuts or substantially abuts the shank of the nail 8.

A rigid disc 10 is located inwardly of the flange 2a of the skin 2. The diameter of the rigid disc 10 is substantially equal to the diameter of the disc 7. The flange 2a of the skin 2 is preferably provided with a bore through which the shank of the nail 8 can be readily inserted. A resilient and cupped holding washer 11 is located within the body 1. This washer 11 is made of any suitable resilient metal. The central part of the metal holding washer 11 is provided with an arched and reentrant boss 12 which is provided with slits or cut-outs 14 in order to provide a series of resilient tongues. In the embodiment of Fig. 1, the nail 8 is provided with a tapered head 15. A resilient metal friction washer 16 is provided with a bore through which the head 15 can pass.

When the parts are assembled, the outer peripheral portion of the resilient metal washer 16 abuts the inner face of the rigid disc 10, and the central part of said resilient metal washer 16 abuts an annular bead of the metal washer 11. The conical head 15 can be readily forced through the central opening 11a of the washer 11. The resilient tongues 12 thus hold the parts locked to each other against longitudinal separation. However, the arm 4 can be turned freely relative to the torso 1. The friction washer 16 maintains the arm 4 in the adjusted position to which it has been turned relative to the body 1.

In making this construction, the arm 4 can be stuffed and the disc 7 can then be located at the end of the stuffing. The edge portion of the skin 5 can then be bent inwardly to provide the flange 4a which is cemented to the outer face of the disc 7. This provides a sub-unit in which the shank of the nail 8 is held perpendicular to the disc 7. The head of the nail is then passed through the alined bores of the flange 2a, the disc 10 and the washers 16 and 11. It is unnecessary to cement the disc 10 to the flange 2a, although this can be done, if desired. The holding washer 11 then holds the parts in assembled position. The stuffing 3 of the body can then be inserted through the neck opening or in any other convenient manner. The diameter of the metal washer 16 is substantially equal to the diameter of the discs 7 and 10. The diameter of the cup washer 11 may be smaller than or equal to the diameter of the discs 7 and 10.

In the embodiment of Fig. 2, the head 15 of the nail 8 has been omitted. The bore 11a of the washer 11 is then made sufficiently small so that the serrations 9 will engage the adjacent edges of the tongues 12.

In the embodiment of Fig. 4, the resilient washer 16 has been omitted, and the frictional action thereof is produced by a helical spring 17 which is located in a recess of the disc 7a, which corresponds to the disc 7 of Fig. 1. In the embodiment of Fig. 4, the holding washer 11 directly abuts the disc 10. A perforated friction disc 18 is longitudinally movable relative to the shank of the nail 8, and this friction disc 18 is urged against the flange 2a of the skin 2 by spring 17. In this embodiment, the flanges 2a and 4a of the respective skins are spaced from each other.

In the embodiment of Fig. 5, a metal holding washer 19, which has the same function as the washer 11 of Fig. 1, is provided with an outwardly directed boss which is perforated and slitted to provide the resilient tongues previously mentioned. A helical compression spring 20 is located in the holding washer 19 and this presses a perforated disc 21 against the disk 10. Fig. 5 shows that the diameter of the holding washer 19 is equal to that of the rigid discs 7 and 10 and this is the preferred construction. The outer or left-hand face of washer 19 is open, in order to permit the free insertion of spring 20 and disc 21, both of which are mounted on the shank of holding member 8. The annular rim of the washer 19 abuts the spacing disc 10, in order to prevent said rim from cutting into the skin 2.

In the embodiment of Fig. 6, the holding washer 19 is the same as in Fig. 5. The frictional force is provided by a resilient metal washer 22, which is located in the holding washer 19.

Fig. 7 illustrates the arm construction which is shown in Fig. 2, assembled with the torso-portion of the doll. The holding washer 11 is of the same construction as member 16 of Fig. 1, save that its central bore is sufficiently small to permit the serrations 9 to be engaged by the adjacent edges of the resilient tongues 12.

The invention is not limited to a doll which has a rubber skin, as it applies to ordinary stuffed cloth dolls and it is not limited to any material for making the skin or covering for the doll. Likewise, the invention is not limited to a stuffed doll.

In the embodiment of Fig. 1, the disc 7 may be turnable relative to the coupling member 8, or said disc 7 may be turnable in unison with coupling member 8. The disc 7 is preferably turnable relative to the coupling member 8. The tongues 12 are under stress, when the parts are assembled, so that said tongues bear against the base of the head 15, and said tongues urge the coupling member 8 inwardly into the body. The reaction of this stress presses the base of the holding washer 11 against the friction washer 16, so that the spacing disc 10 and the limb-disc 7 are forced towards each other, thus producing a frictional grip between the abutting portions of the skins 5 and 2. Since rubber has a high coefficient of friction, the frictional grip holds the limb 4 firmly in its adjusted position relative to the body or torso 1. The shank of the coupling member 8 may or may not engage the disc 10, as desired.

The embodiment of Figs. 2 and 7 operates in substantially the same manner as the embodiment of Fig. 1.

I have disclosed preferred embodiments of my invention, but it is clear that numerous changes and omissions can be made without departing from its spirit.

I claim:

1. In combination, a limb member, a stiffening member located at the inner end of said limb member, a torso, said torso having an opening which is alined with said stiffening member, a rigid coupling member connected to said stiffening member, said rigid coupling member being fixed against movement relative to said stiffening member in a direction parallel to the axis of said coupling member, said coupling member extending through said opening into said torso, the inner end of said limb member abutting the respective portion of the outer wall of said torso, a cup-shaped coupling washer which has an opening through which said coupling member projects, said coupling washer having resilient tongues at said opening, said tongues engaging said coupling member, a friction member mounted slidably on said coupling member, said cup-shaped washer having a flange in which said friction member is located, a resilient member mounted on said friction member and biasing said friction member towards the inner wall of said skin, said friction member being located inwardly of said inner wall of said skin.

2. In combination, a limb member, a stiffening member located at the inner end of said limb member, a torso, said torso having an opening which is alined with said stiffening member, a rigid coupling member connected to said stiffening member, said rigid coupling member being fixed against movement relative to said stiffening member in a direction parallel to the axis of said coupling member, said coupling member extending through said opening into said torso, the inner end of said limb member abutting the respective portion of the outer wall of said torso, a cup-shaped coupling washer which has an opening through which said coupling member projects, said coupling washer having resilient tongues at said opening, said tongues engaging said coupling member, a friction member mounted slidably on said coupling member, said cup-shaped washer having a flange in which said friction member is located, a resilient member mounted on said friction member and biasing said friction member towards the inner wall of said skin, said friction member being located inwardly of said inner wall of said skin, an abutment member which is mounted on said coupling member, said abutment member abutting the inner face of said skin, said flange having an edge which abuts said abutment member, said friction member being located in said torso inwardly of said abutment member and being biased by said resilient member to abut the inner face of said abutment member.

LOUIS A. WEINSTEIN.